United States Patent

Hays

[15] 3,643,685

[45] Feb. 22, 1972

[54] FLOW REGULATOR

[72] Inventor: Russell Duane Hays, Broadview, Ill.

[73] Assignee: Schaub Engineering Co., Downers Grove, Ill.

[22] Filed: Nov. 4, 1970

[21] Appl. No.: 86,901

[52] U.S. Cl. .......................................... 137/501, 251/340
[51] Int. Cl. .......................................... G05d 7/01
[58] Field of Search .................. 137/501, 504, 500, 502, 503

[56] References Cited

UNITED STATES PATENTS

| 2,309,773 | 2/1943 | Kaufman | 137/504 X |
| 2,646,078 | 7/1953 | Adams | 137/501 X |
| 2,845,086 | 7/1958 | Waterman et al. | 137/504 |
| 2,845,087 | 7/1958 | Thomas | 137/504 |
| 2,916,047 | 12/1959 | Butcher | 137/501 |
| 3,015,341 | 1/1962 | Hedland et al. | 137/504 X |

Primary Examiner—M. Cary Nelson
Assistant Examiner—Robert J. Miller
Attorney—Olson, Trexler, Wolters & Bushnell

[57] ABSTRACT

An adjustable fluid flow regulator has an orifice through which the fluid flows. The regulator includes end-to-end housing sections which have precision facing surfaces that define the orifice. The effectively used part of the orifice is preset by a manifold rotatable on the housing. A spring-loaded sensing device comprising a bellows which operates a metering valve maintains a constant pressure differential across the orifice despite variations in upstream and downstream pressures.

10 Claims, 7 Drawing Figures

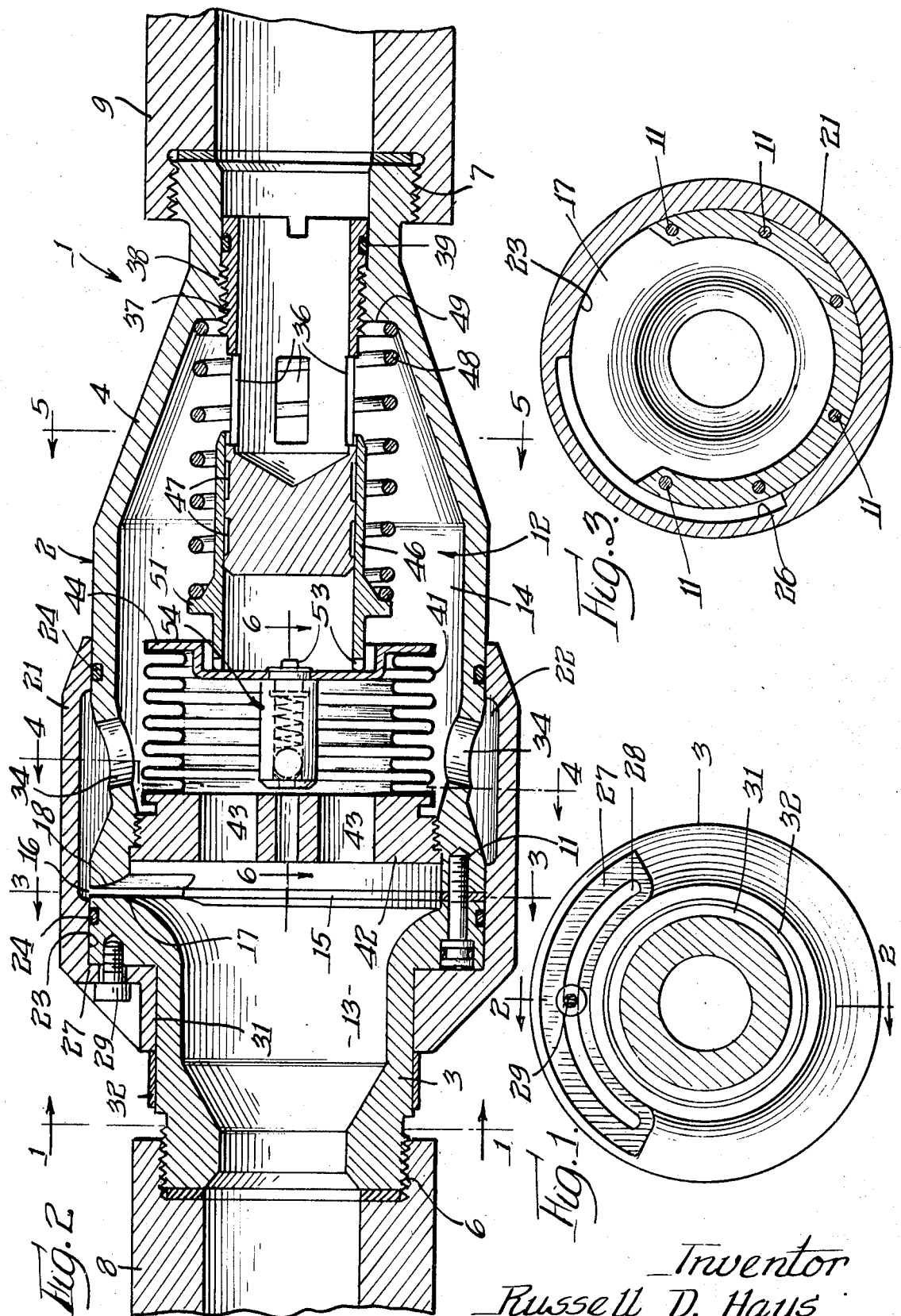

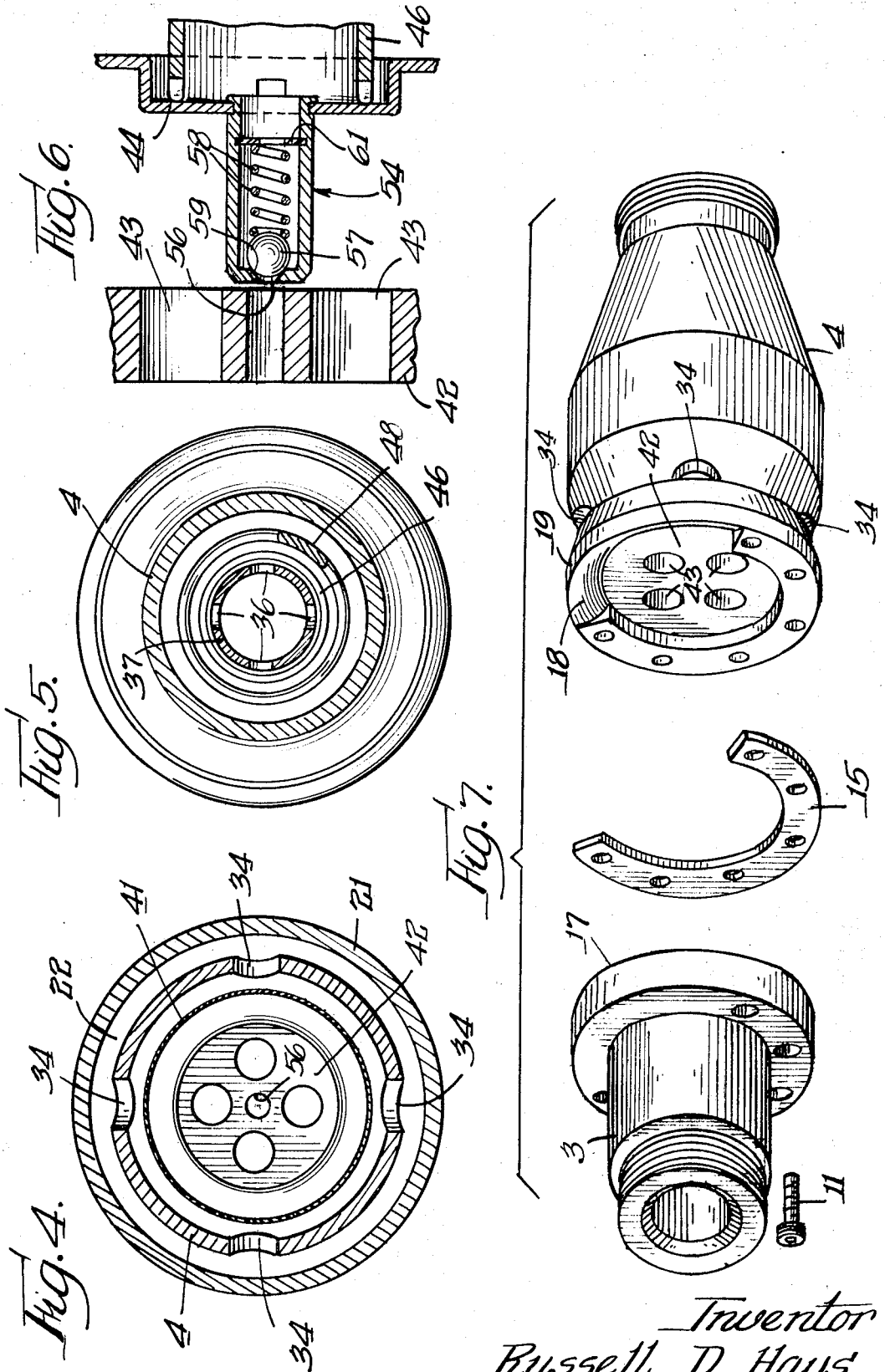

FLOW REGULATOR

This invention relates to improvements in devices for regulating the flow of fluids.

BACKGROUND OF THE INVENTION

The present invention deals with improvements in an adjustable, self-contained flow regulator of the type used primarily for relatively incompressible fluids. In the flow of a fluid of given density, the flow rate may be expressed as a function of the cross-sectional area of an orifice through which the fluid flows and the pressure differential across the orifice. In these devices there is a regulating valve that maintains a constant pressure differential across the orifice, regardless of upstream and downstream pressure variations. Therefore, the flow rate will be a function of the size of the orifice. By designing into the device a suitable calibrated means for increasing or decreasing the size of the orifice, a predetermined flow rate, within limits, can be provided.

OBJECTS AND SUMMARY OF THE INVENTION

An object of this invention is to provide a flow regulator of the type stated in which a constant pressure differential across the orifice is maintained by a bellows which controls a metering valve. Upon increase of the differential pressure, the bellows is caused to expand and operate the metering valve to restrict the metering ports therein. A decrease in the differential pressure causes the bellows to contract and allow a load spring acting thereon and on a metering sleeve of the metering valve to increase the effective cross-sectional areas of the metering ports. By use of the bellows instead of a piston and cylinder, friction in the unit is substantially reduced, and sensitivity and accuracy are increased.

A further object of the present invention is to provide a flow regulator of the type stated in which the housing for the unit is split into two sections which are end-to-end secured, and with facing surfaces forming the orifice. By such an arrangement, it is possible to machine accurately the contours of those facing surfaces. Turbulence of the fluid prior to passage through the orifice may be reduced to increase the usable range of operation of the device. The axial spacing of the two sections may be preadjusted by a shim that is interposed therebetween to determine the transverse width of the orifice.

A still further object of this invention is to provide a flow regulator of the type stated in which there is a manifold on the housing which cooperates with the two housing parts to form a flow passageway from the discharge side of the orifice and back into the outlet or downstream part of the housing. The manifold is rotatable over the discharge side of the orifice to vary the effective or useable area of the orifice. This arrangement provides a simple construction by which the flow rate through the device may be conveniently adjusted.

Another object of this invention is to provide a regulator of the type stated in which the metering valve includes a metering sleeve that is utilized to vary the effective areas of the metering ports. The metering sleeve abuts the bellows assembly but is separate therefrom so that slight cocking of the bellows does not tend to increase the friction between the metering sleeve and the metering tube upon which the sleeve is slidable and in which the metering ports are located.

DESCRIPTION OF THE DRAWINGS

In the drawing:

FIG. 1 is a sectional view of a metering device constructed in accordance with and embodying the present invention and taken along line 1—1 of FIG. 2;

FIG. 2 is a sectional view taken along line 2—2 of FIG. 1 and showing the unit installed in a fluid flow system;

FIGS. 3, 4 and 5 are sectional views taken along lines 3—3, 4—4 and 5—5, respectively, of FIG. 2;

FIG. 6 is an enlarged fragmentary sectional view taken along line 6—6 of FIG. 2 but omitting the bellows for the sake of clarity, and showing the bellows overpressure release check valve; and FIG. 7 is an exploded fragmentary perspective view showing portions of the device, especially at the orifice.

DETAILED DESCRIPTION

Referring now in more detail the drawings, which illustrate a preferred embodiment of the present invention, there is shown an adjustable regulator 1 having a housing 2 that is radially split into two coaxial sections, namely an inlet section 3 and an outlet section 4. The inlet and outlet sections 3, 4 terminate at their remote ends in threads 6, 7 for receiving inlet and outlet pipes 8, 9. The two sections 3, 4 are secured together by circumferentially spaced bolts 11 to define a chamber 12 having an inlet portion 13 and an outlet portion 14. The inlet and outlet sections 3, 4 are face to face over major portions of their arcuate extents, and through such arcuate extent a shim 15 is interposed between the sections 3, 4 and retained by the bolts 11. However, through a minor portion of their arcuate extents, the two sections 3, 4 have facing surfaces 17, 18 that define an orifice 16. In the inlet section 3 the facing surface 17 curves gradually toward the outlet of the orifice at which region it is parallel to the facing surface 18. The surface 18 may be formed in any suitable manner as on a radial flange 19 on the section 4. The axial spacing of the surfaces 17, 18 and hence the width of the orifice 16 may be preadjusted by selection of a shim 15 of appropriate thickness.

Rotatably mounted on the exterior of the housing 2 and coaxial with both the inlet section 3 and the outlet section 4 is a generally cylindrical manifold 21. The manifold 21 has a cylindrical undercut or recess 22, and on either side of the recess 22 the manifold has an inner surface 23 that is sealed against O-rings 24, 24 on the respective peripheries of the sections 3, 4. The recess 22 over a portion 26 (FIG. 3) of its arcuate extent is of a longer axial dimension to the left (FIG. 2) than the remainder of the recess. The arcuate extent of the portion 26 is substantially the same as the arcuate extent of the orifice 16. The discharge side of the orifice 16 is exposed to the recess 22 through the recess portion 26. By rotating the manifold 21, a preselected percentage of the discharge end of the orifice 16 may be closed by the surface 23 to vary the preset flow rate through the orifice. Also provided on the manifold 21 is a radial flange 27 with an arcuate slot 28 through which a lock screw 29 passes to retain the manifold on the housing section 3. The manifold 21 is rotatably adjustable within the limits of the slot 28. An axial flange 31 on the manifold may have a suitable reference mark (not shown) for use with a calibrated scale ring 32 on the section 3.

The fluid discharged from the orifice 16 flows from the recess 22 back into the housing and into the chamber portion 14 thereof through entrance ports 34. Ultimately, the fluid is discharged to the outlet pipe 9 through metering ports 36 in a valve tube 37, the latter being threaded into the bore 38 at the end of the outlet section 4 and sealed therein by an O-ring 39.

A bellows 41, responsive to the pressure differential across the orifice 16, is used to control the areas of the openings effectively utilized by the metering ports 36. Accordingly, the bellows comprises a fixed end plate 42 which is threaded into the housing section 4 and which secures one axial end of the bellows 41. Holes 43 are formed in the end plate 42 so that the interior of the bellows is exposed to inlet pressure in the chamber portion 13. At its other end the bellows 41 is peripherally secured to a cup shaped movable bellows plate 44, the latter abutting and coaxial with an actuator in the form of a metering valve sleeve 46.

As best seen in FIG. 2, the metering valve sleeve 46 slides over the valve tube 37 whereby the valve sleeve 46 may cover varying amounts of the metering ports 36 in accordance with the axial position of the sleeve 46 relative to the tube 37. In this regard it should be noted that the valve tube 37 has axially spaced undercuts or relief grooves 47 which may serve to catch small abrasive particles in the fluid. A load spring 48 encircles the valve tube 37 and valve sleeve 46 and applies force against the valve sleeve 46, biasing it to the left (FIG. 2) which, in turn, applies pressure to the end plate 42 and the bellows 41. To retain the spring 48, the housing section 4 has a radial shoulder 49 and the valve sleeve 46 has a radial flange 51. At the end thereof that is adjacent to the movable end plate 44, the valve tube 37 may have notches 53 for exposure of downstream fluid pressure to the part of the end plate 44 that lies radially inwardly of the sleeve 46.

Referring to FIGS. 2 and 6, attached to the end plate 44 centrally thereof is a tubular check valve housing 54 having an axially open end portion 56. Within the housing 54 is a ball check 57 that is biased by a spring 58 against its valve seat 59. The spring 58 is held by a retaining ring 61. Should an excessive pressure differential be developed across the bellows, the ball check 57 opens to prevent damage to the bellows.

The operation of the device 1 will be apparent from the foregoing description. Suffice it to say, however, that should there be a momentary drop in the pressure differential across the orifice 16 caused by either an increase in the downstream pressure or a decrease in the upstream pressure, such change in pressure will be sensed by the bellows 41 causing it to contact. This causes the load spring 48 to move the valve sleeve 46 to the left, opening greater areas of the metering ports 36, thereby to reduce the downstream pressure in the chamber portion 14 and restore the unit to equilibrium. On the other hand, if there is an increase in the preset pressure drop across the orifice 16, the bellows 41 will expand, moving the end plate 44 to the right, pressing the valve sleeve 46 in opposition to the load spring 48. This closes off greater portions of the metering ports 36 to increase the pressure in the chamber portion 14 to restore the unit to equilibrium.

The invention is claimed as follows:

1. A fluid flow regulator comprising a housing having a first part with a fluid inlet, a second part with a fluid outlet, means for securing said first part and said second part together, said parts having adjacent but spaced apart surfaces defining an orifice opening on its discharge side to the exterior of said housing and opening at its intake side to the interior of said first part and said inlet, said second part having entrance port means in communication with said discharge side, means cooperating with said parts and providing a fluid flow path from the discharge side of said orifice and through said entrance port means and through said second part to said outlet, and regulator means for maintaining a substantially constant pressure differential across said orifice; said regulator means comprising metering valve means having metering port means in said flow path between said outlet and said discharge side, actuator means for varying the effective area of said metering port means, and means in operative connection with said actuator means and responsive to a transient increase in said pressure differential for causing said actuator means to reduced said effective area and responsive to a transient decrease in said pressure differential for causing said actuator means to increase said effective area.

2. A fluid flow regulator according to claim 1 in which the pressure differential responsive means comprises a bellows, the interior of which is exposed to the pressure on one side of the orifice and the exterior of which is exposed to the pressure on the other side of the orifice.

3. A fluid flow regulator according to claim 1 in which said first and second part are secured in end-to-end axial relation and said spaced-apart surfaces define an orifice running generally radially of said housing.

4. A fluid flow regulator according to claim 3 in which said means cooperating with said parts and providing said flow path from the discharge side of said orifice includes a manifold movable on said housing for varying the effective area of said orifice.

5. A fluid flow regulator comprising a housing having a fluid inlet and a fluid outlet, said housing having a chamber and an orifice that opens from the chamber outwardly of said housing, the intake side of said orifice communicating through a part of said chamber with said inlet, means providing communication of the discharge side of said orifice with said outlet through another part of said chamber, said chamber parts being normally isolated except through said orifice, said last-named means including structure forming a flow path exteriorly of the housing, and regulator means for maintaining a substantially constant predetermined pressure differential across said orifice; said regulator means comprising a metering valve having port means for passing fluid from said other chamber part to said outlet, and means including a bellows in said chamber and operable to vary the effective area of said port means responsive to transient variations in pressure differential that depart from said predetermined pressure differential.

6. A fluid flow regulator according to claim 5 including a manifold rotatable on the outside of said housing for adjusting the effective size of said orifice, said manifold cooperating with said housing to provide said flow path.

7. A fluid flow regulator according to claim 5 in which said bellows has a movable end plate, and there is an actuator moved by said end plate and disposed over said port means for varying said effective area.

8. A fluid flow regulator according to claim 5 including conduit means for providing communication through the bellows between said parts of said chamber, and check valve means in said conduit means and normally closing the latter and operable to relieve an excessive pressure differential across said bellows.

9. A fluid flow regulator according to claim 5 in which the housing has end-to-end parts secured together with facing surfaces defining sad orifice, one of said surfaces merging into a smooth curved surface portion intermediate said orifice and said inlet.

10. A fluid flow regulator according to claim 9 in which a shim is interposed between said housing parts.

* * * * *